United States Patent Office 2,878,267
Patented Mar. 17, 1959

2,878,267
19-NOR-STEROID COMPOUNDS AND PROCESS FOR THE PREPARATION THEREOF

Stefan Antoni Szpilfogel and Max Salomon de Winter, Oss, Netherlands, assignors to Organon Inc., Orange, N. J., a corporation of New Jersey No Drawing. Application April 16, 1958
Serial No. 728,784

Claims priority, application Netherlands May 1, 1957

5 Claims. (Cl. 260—397.3)

The invention relates to new biologically active $\Delta^4$-19-nor compounds of the androstane and pregnane series which are not oxygenated in 3-position and to a process for the preparation thereof.

More particularly it relates to novel 19-nor steroid compounds of the general formula:

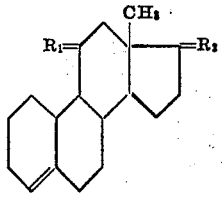

in which $R_1$ is selected from the group consisting of $H_2$, (H)OH and =O in case $R_2$ is selected from the group consisting of (H)COCH$_3$, (H)COCH$_2$OR$_3$ and (OH)COCH$_2$OR$_3$, in which $R_3$ is selected from the group consisting of hydrogen and acyl radicals derived from a carboxylic acid containing from 1 to 10 carbon atoms, and in which $R_1$ is selected from the group consisting of (H)OH and =O, in case $R_2$ is selected from the group consisting of (H)OR$_3$,(R$_4$)OR$_3$, and =O, in which $R_3$ is as indicated above and $R_4$ is selected from the group consisting of a methyl, ethyl, and vinyl group. These novel compounds exert strongly gonad-inhibiting effects.

These novel compounds also have anabolic, androgenic, and progestative properties.

The process according to the invention is characterized in that a $\Delta^4$-3-hydroxy-19-nor steroid compound of the androstane or pregnane series etherified or esterified in 3-position is treated with an alkali metal in liquid ammonia or in a lower aliphatic primary amine, by which the substituent in 3-position is split off.

The $\Delta^4$-3-hydroxy-19-nor steroid compounds to be applied as starting products can be obtained by reduction of the corresponding 3-keto compounds. This reduction may be carried out by means of one of the commonly used reduction agents, such as an alkali metal borohydride, an alkali metal aluminiumhydride, an alkali metal trialkoxyborohydride, or aluminium isopropoxide in isopropanol.

After the hydroxyl group in 3-position has been etherified or esterified, splitting off according to the invention may take place. This ether group may be an alkoxy, aryloxy, or aralkoxy group, e. g. a methoxy, ethoxy, isopropoxy, pentoxy, phenyloxy, benzoxy or triphenyl methoxy group.

The etherification may be carried out by treating the starting substance in a suitable organic solvent with an alcohol in the presence of an inorganic acid, e. g. hydrochloric acid. In some cases the alcohol may at the same time serve as a solvent. It is also possible to carry out the etherification by treating the 3-hydroxy compound with a hydro carbon halogenide, e. g. triphenylmethyl halogenide, in the presence of e. g. pyridine.

The esterification may be carried out by reacting the $\Delta^4$-3-hydroxy compound with an acid, preferably in the presence of a dehydrating agent, such as ethoxy acetylene, or by reacting the starting product with an acid anhydride, if desired in the presence of a suitable solvent, such as pyridine. It is also possible to carry out the esterification by means of the acid chloride, preferably in the presence of a tertiary base, such as pyridine or chinoline.

The splitting off of the substituent in 3-position takes place by treating the starting material, dissolved in a suitable solvent, with an alkali metal in the presence of liquid ammonia or of a lower aliphatic primary amine containing from 1 to 6 carbon atoms. As a solvent may e. g. be used a lower aliphatic ether, such as dimethyl ether, methyl ethyl ether, diethyl ether, further dioxane and tetrahydrofurane.

The alkali metal which is applied in this reaction may be e. g. lithium, sodium, or potassium. It has appeared of advantage to use lithium.

As examples of lower aliphatic primary amines to be used are mentioned methyl amine, ethyl amine, n-propylamine, isopropylamine, n-butylamine and n-amylamine.

If the present reduction is carried out in the presence of a lower aliphatic primary amine the reaction in question is e. g. carried out at the boiling-point of this amine. However, if the boiling-point of this amine exceeds 0° C., it is desirable to carry out the reduction at a temperature below 0° C.

If the 3-keto steroid compound to be reduced contains one or more keto groups in addition to the said 3-keto group, these groups may be protected, prior to the reduction, e. g. by ketalization. If these keto groups have not been protected, they are converted, in the course of the reduction reaction, into hydroxyl groups which can again be converted into keto groups by oxidation in the commonly used manner.

If the $\Delta^4$-3-hydroxy steroid compound obtained after the reduction contains in addition a hydroxyl group in 17 or 21-position, the corresponding 17 or 21-acylate will, in most of the cases, be formed on esterifying the 3-hydroxyl group. If desired the 17 or 21-ester obtained after the splitting off of the 3-acyloxy group can then be saponified and, if necessary, again be esterified.

The etherification of the $\Delta^4$-3-hydorxy steriod compound will only ocur at the 3-hydroxyl group, because this group is activated by the presence of the $\Delta^4$-bond. After splitting off of the 3-ether group the thus obtained compound, if containing esterifiable hydroxyl groups, can be esterified, if desired.

The esterification is preferably carried out with an aliphatic, aromatic or araliphatic carboxylic acid containing from 1 to 10 carbon atoms or a functional derivative thereof, e. g. acetic acid, propionic acid, butyric acid, valeric acid, capronic acid, isocapronic acid, succinic acid, tartaric acid, cyclopentyl acetic acid, β-cyclopentyl propionic acid, cyclohexyl acetic acid, γ-cyclohexyl butyric acid, phenyl acetic acid, β-phenyl propionic acid, benzoic acid, glycine, alanine, and phenylalanine.

Example I

To a solution of 3.0 g. of $\Delta^4$-11β,17β-dihydroxy-3-keto-17α-methyl-19-nor-androstene in 150 ml. of methanol are added 1.4 g. of sodium borohydride. After leaving to stand for 20 minutes the reaction mixture is neutralized with glacial acetic acid and then evaporated in vacuo to a volume of 25 ml. The residue is poured into 200 ml. of water, after which the $\Delta^4$-3,11β,17β-trihydroxy-17α-methyl-19-nor-androstene crystallizes out.

The sucked off crystals are dissolved in 112 ml. of methanol, after which 1.6 ml. of 36% hydrochloric acid are added to this solution. The resulting solution is stirred at room temperature for 1 hour, after which the reaction mixture is neutralized with sodium bicarbonate and evaporated to 25 ml. The residue is poured into 200 ml. of water, after which the resulting crystals of $\Delta^4$-3-methoxy - $11\beta,17\beta$ - dihydroxy - $17\alpha$ - methyl-19-norandrostene are sucked off and subsequently recrystallized from acetone.

2.3 g. of this compound are dissolved in 25 ml. of dry ether, after which a solution of 2 g. of lithium in 90 g. of ethyl amine is added dropwise to this solution. After stirring for 10 minutes the excess of lithium is removed by slowly adding 15 ml. of methanol to the reaction mixture. After the reaction mixture has been discoloured the ethyl amine is evaporated in vacuo. The residue is taken up in ice water, after which the mixture is extracted some times with ether. The collected ether extracts are washed, after which the ether is evaporated in vacuo. The residue is distributed between 70% methanol and petroleum ether, the petroleum ether layer is separated, dried, and finally evaporated to dryness. On crystallization from petroleum ether the residue yields the $\Delta^4$-$11\beta,17\beta$-dihydroxy-$17\alpha$-methyl-19-nor-androstene.

A solution of 1 g. of this compound in 3.2 g. of acetic anhydride and 4.0 g. of pyridine is heated on a steambath for one hour in nitrogen atmosphere and then poured into ice-water. The precipitate is separated and then crystallized from a mixture of methanol and petroleum ether, after which the $\Delta^4$-$11\beta,17\beta$-dihydroxy-$17\alpha$-methyl-19-nor-androstene-17-acetate is obtained.

In a corresponding manner the esters of this compound have been prepared derived from capronic acid, succinic acid, cyclopentyl acetic acid, and $\beta$-phenyl propionic acid.

*Example II*

In an analogous manner as described in Example I the $\Delta^4$-3-keto - $11\beta,17\beta$ - dihydroxy - $17\alpha$ - vinyl - 19 - norandrostene is reduced to the corresponding 3-hydroxy compound, which is then converted, by means of isopropanol and hydrochloric acid, into the corresponding 3-isopropoxy compound.

Using the method of Example I this compound is treated with a solution of sodium in methylamine, after which the $\Delta^4$-$11\beta,17\beta$-dihydroxy-$17\alpha$-vinyl-19-nor-androstene is obtained.

Esterification of this compound, in an analogous manner as described in Example I, yields the 17-esters, derived from propionic acid, t. butyl acetic acid, nonane carboxylic acid, and $\gamma$-cyclohexylbutyric acid.

In a corresponding manner and starting from $\Delta^4$-3,11-diketo-$17\beta$-hydroxy-$17\alpha$-ethyl-19-nor-androstene, the $\Delta^4$-11-keto-$17\beta$-hydroxy - $17\alpha$ - ethyl-19-nor-androstene has been obtained. Subsequently the 17-esters of this compound have been prepared, derived from acetic acid, nonane carboxylic acid, and cyclopentylpropionic acid.

*Example III*

3.04 g. of $NaBH_4$ are added to a solution of 2.9 g. of $\Delta^4$-21-hydroxy-3,20-diketo-19-nor pregnene in 400 ml. of methanol. The reaction mixture is stirred at room temperature for 1 hour, then adjusted to pH 5.4 with glacial acetic acid, subsequently evaporated in vacuo to about 30 ml., and finally diluted with 200 ml. of water. The solution is extracted with chloroform and the extract is washed with ice cold 1 N sodium hydroxide and subsequently with water till neutral. After drying and evaporating the solvent the crude $\Delta^4$-3,20,21-trihydroxy-19-nor-pregnene is obtained.

This is dissolved in 8 ml. of pyridine, after which 4.2 g. of propionic acid anhydride are added to this solution. The reaction mixture is stirred at room temperature for 20 hours, after which the solution is decomposed by the addition of water. The mixture is subsequently evaporated to dryness, after which the residue is recrystallized from methanol. Obtained is the $\Delta^4$-3,20,21-tripropionyloxy-19-nor pregnene.

The sucked off crystals are dissolved in 120 ml. of absolute ether, after which this solution is added to a solution of 0.9 g. of sodium in 25 ml. of methylamine. The blue coloured solution is subsequently stirred at $-15°$ C. for 2 hours, after which 18 ml. of absolute ethanol are added to the reaction mixture. Then the methylamine is evaporated, the residue is diluted with water, and the mixture is extracted a few times with ether. The collected ether extracts are washed with water, dried on sodium sulphate, and evaporated to dryness. The residue is crystallized from methanol and then from petroleum ether, after which the $\Delta^4$-20,21-dipropionyloxy-19-nor pregnene is obtained.

Saponification of this compound by treatment hereof with a 0.5% sodium hydroxide solution for 15 minutes at room temperature yields the $\Delta^4$-20,21-dihydroxy-19-nor pregnene.

3 g. of this compound are dissolved in 15 ml. of dioxane, after which 5 ml. of pyridine and 0.9 ml. of acetic acid anhydride are added. The reaction mixture is stirred at room temperature for 24 hours, after which it is evaporated to dryness in vacuo. The dry residue consisting of $\Delta^4$-20,21-dihydroxy-19-nor-pregnene-21-acetate is dissolved in 30 ml. of acetone. While stirring and at 0° C. a chromic acid solution is added dropwise to this solution. This chromic acid solution has been prepared by dissolving 84 g. of chromium trioxide in 120 ml. of water and 62 ml. of concentrated sulphuric acid, after which the solution is completed to 300 ml. with water. The chromic acid solution is added dropwise until constant yellow colouring has occurred. The reaction mixture is then evaporated to nearly dryness in vacuo, after which the residue is taken up in water. The aqueous mixture is extracted with chloroform, after which the chloroform layer is separated, washed with diluted sulphuric acid, then with a cold dilute sodium hydroxide solution, and subsequently with water till neutral. After evaporating the solvent the $\Delta^4$-21-hydroxy-20-keto-19-nor-pregnene-21-acetate is obtained. By saponification with a dilute sodium hydroxide solution the unesterified compound is obtained herefrom.

Acylation of this compound with butyric anhydride, $\beta$-cyclopentylpropionic anhydride or succinic anhydride in pyridine afford the 21-butyrate, 21$\beta$-cyclopentylpropionate, and 21-hemi succinate respectively.

*Example IV*

In accordance with the process described in Example III the $\Delta^4$-3,20-diketo-$11\beta$-$17\alpha$-dihydroxy-19-nor-pregnene and the $\Delta^4$-3,20-diketo-$17\alpha$,21-dihydroxy-19-nor-pregnene have been converted into $\Delta^4$-$11\beta$,$17\alpha$-dihydroxy-20-keto-19-nor-pregnene, resp. into $\Delta^4$-$17\alpha$,21-dihydroxy-20-keto-19-non-pregnene.

In accordance with the method described in Example III this latter compound has been converted into the corresponding 21-esters, derived from trimethyl acetic acid, benzoic acid, cyclohexyl acetic acid and $\beta$-phenylpropionic acid.

*Example V*

3.04 g. of $NaBH_4$ are added to a solution of 2.9 g. of $\Delta^4$-3,20-diketo-19-nor-pregnene in 400 ml. of methanol. The reaction mixture is stirred at room temperature for 1 hour, then adjusted to a pH of 5.4 with glacial acetic acid, subsequently evaporated in vacuo to about 30 ml., and finally diluted with 200 ml. of water. The solution is extracted with chloroform and the extract is washed with ice cold 1 N sodium hydroxide and subsequently with water till neutral. After drying and evaporating of the solvent the crude $\Delta^4$-3,20-dihydroxy-19-nor-pregnene is obtained.

This is dissolved in 65 ml. of methanol, after which 1.5 ml. of concentrated hydrochloric acid are added to this solution. The resulting solution is stirred at room temperature for 40 minutes, after which the mixture is neutralized with sodium bicarbonate and evaporated to 15 ml. The residue is poured into 200 ml. of water, when the $\Delta^4$-3-methoxy-20-hydroxy-19-nor-pregnene crystallizes out.

The sucked off crystals are dissolved in 120 ml. of absolute ether after which 120 ml. of liquid ammonia and subsequently 0.9 g. of sodium cut to small pieces are added to this solution. The blue coloured solution is subsequently stirred at $-35°$ C. for 2 hours, after which 18 ml. of absolute ethanol are added to the reaction mixture. Then the ammonia is evaporated, the residue is diluted with water, and the mixture is extracted a few times with ether. The collected ether extracts are washed with water, dried on sodium sulphate, and evaporated to dryness. The residue is crystallized from methanol and then from petroleum ether, after which the $\Delta^4$-20-hydroxy-19-nor-pregnene is obtained.

0.5 g. of this compound is dissolved in 25 ml. of acetone. While stirring and at $0°$ C. a chromic acid solution is dropwise added to this solution. This chromic acid solution has been prepared by dissolving 70 g. of chromium trioxide in 100 ml. of water and 55 ml. of concentrated sulphuric acid, after which the solution is completed with water to 250 ml. The chromic acid solution is added dropwise for such a long time until remaining yellow coloration has occurred. Then the reaction mixture is evaporated in vacuo to nearly dryness, after which the residue is taken up in water. The aqueous mixture is extracted with chloroform, after which the chloroform layer is separated, washed with dilute sulphuric acid, then with a cold dilute sodium hydroxide solution and subsequently with water till neutral. After evaporating the solvent the $\Delta^4$-20-keto-19-nor-pregnene is obtained.

In a corresponding manner the $\Delta^4$-17α-hydroxy-3,20-diketo-19-nor-pregnene has been converted into the corresponding 3,17α,20-dihydroxy compound by means of sodium borohydride, and then, by treatment with triphenylchloromethane in the presence of pyridine converted into the $\Delta^4$-3-triphenyl methoxy-17α,20-dihydroxy-19-nor-pregnene.

Subsequently this compound has been converted into the $\Delta^4$-17α,20-dihydroxy-19-nor-pregnene, by means of sodium and isopropylamine, using the method of Example III. Oxidation of this compound by means of chromic acid in acetone afforded the $\Delta^4$-17α-hydroxy-20-keto-19-nor-pregnene.

*Example VI*

In accordance with the process described in Example III the $\Delta^4$-17α,21-dihydroxy-3,11,20-triketo-19-nor-pregnene has been converted into a $\Delta^4$-3-methoxy-17α,20β,21-trihydroxy-11-keto-19-nor-pregnene by reduction with sodium borohydride and a subsequent treatment with methanol and concentrated hydrochloric acid.

By a subsequent treatment with potassium and methylamine the $\Delta^4$-17α,20β,21-trihydroxy-11-keto-19-nor-pregnene has been obtained in accordance with the process described in Example I.

0.3 g. of this compound is dissolved in 1.5 ml. of dioxane, after which 75 ml. of pyridine and 70.5 ml. of acetic acid anhydride are added. The reaction mixture is stirred at room temperature for 24 hours, after which it is evaporated to dryness in vacuo. The dry residue consisting of $\Delta^4$-17α,20β,21-trihydroxy-11-keto-19-nor-pregnene-21-acetate is dissolved in 45 ml. of acetone and then oxidized in a manner as described in Example V.

Obtained is the $\Delta^4$-17α,21-dihydroxy-11,20-diketo-19-nor-pregnene-21-acetate. Saponification of this compound by treatment hereof with a 0.5% sodium hydroxide solution for 10 minutes at room temperature yields the $\Delta^4$-17α,21-dihydroxy-11,20-diketo-19-nor-pregnene.

By esterification with butyric anhydride, succinic anhydride, and β-phenyl propionic anhydride, this compound has been converted into the corresponding 21-esters thereof.

1. g. of $\Delta^4$-17α,21-dihydroxy-11,20-diketo-19-nor-pregnene-21-acetate is suspended in 27 ml. of methanol and 6.5 ml. of dimethyl formamide. To this mixture are added 0.7 g. of semicarbazide-HCl and a solution of 0.43 g. of sodium bicarbonate in 5 ml. of water. Then in nitrogen atmosphere the reaction mixture is refluxed for 3 hours and subsequently maintained at $45°$ C. for 24 hours. Then 35 ml. of water are added to the mixture, the mixture is cooled to $0°$ C., the 20-mono-semi-carbazone precipitated after some hours is filtered and dried in vacuo.

The resulting dry residue is suspended in 12 ml. of water and 50 ml. of tetrahydrofurane, after which the suspension is heated until a clear solution has been obtained. To the solution, cooled to room temperature, a solution of 220 mg. of sodium borohydride in 5 ml. of water is subsequently added in a nitrogen atmosphere and with stirring. Then the reaction mixture is stirred for 5 hours, after which it is brought to a pH of 6–7 with glacial acetic acid. The mixture is evaporated in vacuo to nearly dryness, after which the residue is taken up in a mixture of 15 ml. of chloroform and 15 ml. of 2 N sulphuric acid. It is refluxed for 5 minutes and then cooled. The chloroform layer is subsequently separated and the remaining aqueous layer is extracted with chloroform. The collected chloroform extracts are washed with a dilute sodium hydroxide solution and then with water till neutral. After drying and evaporating the solvent, the residue is crystallized from a mixture of methanol and acetone, after which the $\Delta^4$-11β,17α,21-trihydroxy-20-keto-19-nor-pregnene-21-acetate is obtained.

Saponification of this compound by treatment with a 0.5% sodium hydroxide solution for 15 minutes at room temperature yields the $\Delta^4$-11β,17α,21-trihydroxy-20-keto-19-nor-pregnene.

In accordance with the process described in Example III the 21-esters of this compound have been prepared derived from valeric acid, succinic acid, β-phenyl propionic acid, and glycine.

*Example VII*

2.75 g. of $NaBH_4$ are added to a solution of 5.5 g. of $\Delta^4$-17-hydroxy-3-keto-19-nor-androstene in 200 ml. of methanol at room temperature. After leaving to stand for 20 minutes the reaction mixture is neutralized with glacial acetic acid and then evaporated in vacuo to a volume of 25 ml. The residue is poured into 200 ml. of water, after which the $\Delta^4$-3,17-dihydroxy-19-nor-androstene crystallizes out.

The sucked off crystals are dissolved in 15 ml. of pyridine, after which 10.2 g. of acetic acid anhydride are added to this solution. The reaction mixture is kept at room temperature for 20 minutes, after which 20 ml. of water are added. The mixture is subsequently evaporated to dryness, after which the residue is recrystallized from methanol. Obtained is the $\Delta^4$-3,17-diacetoxy-19-nor-androstene.

2 g. of the thus prepared compound are dissolved in 25 ml. of dry ether, after which this solution is added dropwise to a solution of 2 g. of lithium in 90 g. of ethylamine. After stirring for 10 minutes the excess of lithium is removed by slowly adding 15 ml. of methanol to the reaction mixture. After the reaction mixture is discoloured, the ethylamine is evaporated in vacuo. The residue is taken up in ice-water, after which the mixture is extracted a few times with ether. The collected ether extracts are washed, after which the ether is evaporated in vacuo. The residue is distributed between 70% methanol and petroleum ether, the petroleum ether layer is separated, dried, and finally evaporated to dryness. On crystallization from petroleum ether the residue yields the $\Delta^4$-17β-acetoxy-19-nor-androstene. Saponification of this compound by treatment with a dilute methanolic sodium hydroxide solution yields the $\Delta^4$-17β-hydroxy-19-nor-androstene of melting-point $98°$ C.

Example VIII

To a solution of 5.8 g. of Δ⁴-3-keto-11β,17β-dihydroxy-19-nor-androstene in 200 ml. of methanol are added 2.79 g. of sodium borohydride at room temperature. After leaving to stand for 20 minutes the reaction mixture is neutralized with glacial acetic acid and then evaporated in vacuo to a volume of 25 ml. The residue is poured into 200 ml. of water, after which the Δ⁴-3,11β,17β-trihydroxy-19-nor-androstene crystallizes out.

The sucked off crystals are dissolved in 25 ml. of pyridine after which 30.3 g. of cyclopentyl propionic anhydride are added to this solution. The reaction mixture is refluxed for 30 minutes, after which 25 ml. of water are added. The mixture is subsequently evaporated to dryness, after which the residue is crystallized from methanol-petroleum ether. Obtained is the Δ⁴-3,11β,17β-trihydroxy - 19 - nor - androstene - 3,17β - dicyclopentylpropionate.

2 g. of the thus prepared compound are dissolved in 25 ml. of dry ether, after which this solution is added dropwise to a solution of 2 g. of lithium in 90 g. of ethylamine. After stirring for 10 minutes the excess of lithium is removed by slowly adding 15 ml. of methanol to the reaction mixture. After the reaction mixture is discoloured, the ethylamine is evaporated in vacuo. The residue is taken up in ice-water, after which the mixture is extracted a few times with ether. The collected ether extracts are washed, after which the ether is evaporated in vacuo. The residue is distributed between 70% methanol and petroleum ether, the petroleum ether layer is separated, dried, and finally evaporated to dryness. On crystallization from petroleum ether the residue yields the Δ⁴-11β - 17β - dihydroxy - 19 - nor - androstene - 17β - cyclopentyl propionate. Saponification of this compound by treatment with a dilute methanol sodium hydroxide solution yields the Δ⁴-11β,17β-dihydroxy-19-nor-androstene.

According to the process described in example I this compound has been converted into the 17-esters derived from capronic acid, cyclohexyl acetic acid, and hexahydrobenzoic acid.

In addition, the above described Δ⁴-11β,17β-dihydroxy-19-nor-androstene has been oxidized to the corresponding Δ⁴-11,17-diketo-19-nor-androstene by means of a chromic acid solution in a mixture of water and acetic acid.

Example IX

In a corresponding manner as described in Example I the Δ⁴-17β-hydroxy-17α-methyl-3-keto-19-nor-androstene is reduced to the corresponding 3-hydroxy compound by means of sodium borohydride.

4.9 g. of this compound are then dissolved in 105 ml. of ethanol, after which 2.8 ml. of concentrated hydrochloric acid are added to this solution. The process of this reaction mixture is carried out as described in Example I, after which the Δ⁴-3-ethoxy-17β-hydroxy-17α-methyl-19-nor-androstene is obtained.

3 g. of this compound are dissolved in 125 ml. of absolute ether. To this solution are added 120 ml. of liquid ammonia and subsequently 0.9 g. of lithium cut to small pieces. The blue coloured solution is then stirred at −35° C. for 2 hours, after which 20 ml. of absolute ethanol are added at the same temperature as a result of which the blue colour disappears. The ammonia is evaporated, the residue is diluted with water and the resulting mixture is extracted a few times with ether. The collected ether extracts are washed with water, dried on sodium sulphate and evaporated to dryness. The residue is distributed between petroleum ether and 70% methanol (1:1), the petroleum ether layer is separated, the petroleum ether evaporated to half the original volume, after which crystallization of the Δ⁴-17β-hydroxy-17α-methyl-19-nor-androstene takes place. This compound has a melting-point of 147°–151° C.

Entirely in accordance with the process described in this example the Δ⁴-17β-hydroxy-17α-ethyl-3-keto-19-nor-androstene is reduced to the Δ⁴-17β-hydroxy-17α-ethyl-19-nor-androstene via the 3-methoxy compound.

We claim:

1. Process for the preparation of new Δ⁴-19-nor-steroid compounds comprising reacting a compound of the formula:

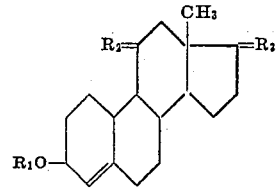

in which $R_1$ is selected from the group consisting of an acyl group derived from a carboxylic acid containing from 1 to 8 carbon atoms, and an alkyl group containing from 1 to 6 carbon atoms and the triphenyl methyl group, $R_2$ is selected from the group consisting of $H_2$, (H)OH and =O, and $R_3$ is selected from the group consisting of =O, (H)COCH$_3$, (H)COCH$_2$OR$_4$, (OH)COCH$_2$OR$_4$, (H)OR$_4$, and (R$_5$)OR$_4$, in which $R_4$ is selected from the group consisting of hydrogen and acyl radicals derived from a carboxylic acid containing from 1 to 10 carbon atoms, and $R_5$ is selected from the group consisting of a methyl, ethyl, and vinyl group, with an alkali metal in the presence of a compound selected from the group consisting of liquid ammonia and a lower aliphatic primary amine containing from 1 to 6 carbon atoms, and in the presence of an organic solvent selected from the group consisting of a lower aliphatic ether, dioxane and tetrahydrofurane, and at a temperature below 20° C., by which the substituent in 3-position is split off.

2. Process according to claim 1, wherein lithium is used as alkali metal.

3. Process according to claim 1, wherein the reaction is carried out below 0° C.

4. Steroid compounds of the formula:

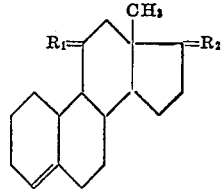

in which $R_1$ is selected from the group consisting of $H_2$, (H)OH and =O, and $R_2$ is selected from the group consisting of (H)COCH$_3$, (H)COCH$_2$OR$_3$, and (OH)COCH$_2$OR$_3$ in which $R_3$ is selected from the group consisting of hydrogen and acyl radicals derived from a carboxylic acid containing from 1 to 10 carbon atoms.

5. Steroid compounds of the formula:

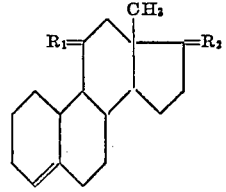

in which $R_1$ is selected from the group consisting of (H)OH, and =O, and $R_2$ is selected from the group consisting of =O, (H)OR$_3$, and (R$_4$)OR$_3$, in which $R_3$ is selected from the group consisting of hydrogen and acyl radicals derived from a carboxylic acid containing from 1 to 10 carbon atoms and $R_4$ is selected from the group consisting of a methyl, ethyl, and vinyl group.

References Cited in the file of this patent

UNITED STATES PATENTS 2,781,365    Djerassi et al. _____ Feb. 12, 1957